Patented Jan. 14, 1947　　　　　　　　　　　　　　　　　　　　　2,414,145

UNITED STATES PATENT OFFICE 2,414,145

PLASTICIZING OF VULCANIZED RUBBER

Walter W. Evans, East Kingston, N. H., assignor to Boston Woven Hose & Rubber Company, a corporation of Massachusetts No Drawing. Application April 27, 1942,
Serial No. 440,658

8 Claims. (Cl. 260—71.6)

This invention relates to improvements in the treatment of vulcanized rubber to convert it into a form suitable for use for the manufacture of new rubber articles. More particularly the invention relates to the plasticizing of vulcanized rubber scrap to convert it into a plastic condition suitable for use for the manufacture of new vulcanized articles and products.

According to the present invention vulcanized rubber scrap is plasticized by subjecting it to oxidizing conditions with admixture therewith of an acid material such as a higher fatty acid and of a thiophenol or mercaptan at low temperatures and with mechanical working of the material as on a mixing mill or in an internal mixer.

It has been proposed to reclaim rubber by heating vulcanized scrap in the presence of a thiophenol, for example by refluxing ground scrap with a thiophenol and a large excess of water for a period of several hours or by digesting the scrap with a thiophenol and a large amount of water for a period of several hours under steam pressure or by heating the scrap with a thiophenol in direct contact with steam at high pressure.

I have found that vulcanized rubber scrap can be advantageously plasticized at low temperatures without the use of high pressure steam or refluxing or digesting in the presence of water. I have found that vulcanized rubber scrap can be readily plasticized by the admixture therewith of an acid material, and particularly of a higher fatty acid, together with a small amount of a mercaptan or thiophenol, and by mechanically admixing the materials under oxidizing conditions and with the resulting production of a plasticized material well adapted for use for the manufacture therefrom of new vulcanized rubber products.

The vulcanization of rubber causes changes both chemical and physical. Its characteristics as a colloid are modified, it is converted from the sol to the gel state and at the same time some chemical combination of sulfur takes place. Vulcanization brings about a change in the physical characteristics from low to high tensile strength, a substantial increase in elasticity, a marked decrease in plasticity and solubility in the common solvents and a complete loss of tack. When an attempt is made to rework vulcanized rubber on a rubber mill it is disintegrated into a non-tacky, powdery mass whereas unvulcanized rubber softens into a soft, tacky, plastic mass, the softness increasing with the time of milling.

I am led to believe that the present process, which enables the vulcanized scrap to be readily plasticized, involves a reversal of the vulcanization process at least from a physical standpoint.

I have found that if well vulcanized rubber is ground to a finely divided condition, mixed with acidic substances such as oleic acid, stearic acid and rosin, together with a small amount of a mercaptan or thiophenol this finely ground mass may then be mixed on a mill under oxidizing conditions to give a recovered rubber having many of the physical characteristics of unvulcanized rubber and which can be mixed with additional curing agents and revulcanized to give very high tensile strengths.

The acid materials which I have found particularly advantageous for use in the present process are the higher fatty acids such as oleic and stearic acids and other higher fatty acids both unsaturated and saturated. When rosin acids are used it is desirable to add a suitable antioxidant before the products are revulcanized, to improve the ageing properties of the vulcanized products. Both the fatty acids and the rosin acids appear to have a valuable influence in bringing about the dispersion of the vulcanized rubber scrap. I am led to believe also that these acidic materials tend to neutralize and overcome the retarding effect of zinc oxide and similar materials present in vulcanized rubber and which would otherwise prevent or retard the softening of the rubber scrap. Only small amounts of the acid material are required, e. g. around 2% or less with low zinc oxide scrap and higher amounts with high zinc oxide scrap.

The mercaptans which are used in the present process have the general formula RSH. In the mercaptans R may be an alkyl, alicyclic or heterocyclic radical which may or may not be substituted with one or more functional groups, excluding however groups which contribute accelerating properties, such as a nitrogen containing group. In the aromatic mercaptans or thiophenols R is an aromatic radical which may or may not be substituted with other functional groups, but excluding groups which contribute accelerating properties to the molecule. Among the mercaptans may be mentioned the following: benzyl mercaptan (phenyl methanethiol), 2-ethyl hexyl mercaptan (2-ethyl hexanethiol-1), 2-mercapto-octane (octanethiol-2) lauryl mercaptan (dodecanethiol-1), thioglycollic acid (a-mercaptoacetic acid), a-mercaptostearic acid (2-thiooctadecanoic acid), bb'-dimercaptodiethyl ether (di-(-2-thiolethyl) oxide), tetrahydrofurfuryl mercaptan, 4-morpholin methyl mercaptan, 2,5- dimetcapto - 1,3,4 - thiodiazole (persulfocyanic acid), dimethyl thiophenol and bornyl mercaptan.

Among the thiophenols suitable for use may be mentioned the thiophenols and thionaphthols, for example, thiophenol (phenyl mercaptan), para-thiocresol (para-tolyl mercaptan), a-thionaphthol (a-naphthyl mercaptan), b-thionaphthol (b-naphthyl mercaptan), etc.

While I do not desire to limit myself by any theoretical explanation of the action of the thiophenol or mercaptan, I am led to believe that they exert a solubilizing or swelling action on the sulfur bridges by which the rubber molecules are bound in the vulcanized rubber, and that this action combined with the oxidation to which the vulcanized rubber is subjected and the action of the fatty material changes the vulcanized rubber back to the plastic condition, in which it has many of the characteristics which prevail before vulcanization. In any event the material subjected to the process is converted into a tacky condition, it is plastic instead of elastic, there is little elasticity, and the product has a low tensile strength similar to that of unvulcanized rubber. The rubber hydrocarbon moreover has not been degraded as is the case when vulcanized rubber is subjected to heating for a long time with steam or alkali or by the usual methods of devulcanization. On the contrary, the plasticized rubber produced by the process may be mixed with sulfur and accelerator again and recured or revulcanized and will give a product with a high tensile strength and good elongation.

The oxidation of the rubber can be accomplished even at the low temperatures of the process by the action of atmospheric air, as when the mixing is carried out on a mill, or in an internal mixer in the presence of atmospheric air. The oxidation can advantageously be accomplished by mixing a small quantity of an oxidizing material such as benzoyl peroxide, hydrogen peroxide or ammonium persulfate, etc., with the vulcanized rubber scrap and added fatty material and thiophenol or mercaptan. The oxidation of the rubber during milling at low temperatures appears to be important in enabling the plasticizing of the vulcanized rubber to be accomplished in relatively short periods of time; and the use of oxidizing agents such as those mentioned to facilitate and promote the oxidation of the rubber during milling is advantageous in reducing the time required for milling.

The milling of the vulcanized scrap with the added materials is carried out at relatively low temperatures and with avoidance of heating of the materials to high temperatures. In general the milling temperature will not exceed around 510° F. or 65° C. and will be considerably below the higher temperatures involved in heating with steam or in refluxing or digestion with water. An ordinary mixing roll is well adapted for use in carrying out the process but an internal mixer in which effective mixing of the materials under oxidizing conditions can be effected can be used.

The invention will be further illustrated by the following specific description and examples, the parts being by weight.

*Example I.*—100 parts of finely ground red inner tubes, 5 parts of rosin, 2 parts of oleic acid and 0.05 part of benzoyl peroxide are mixed together and plasticized on a mill with 2 parts of octyl mercaptan. This gave a well plasticized rubber in about 25 minutes. When this was compounded with 2% of sulfur and 1% of diphenylguanidine and vulcanized the following results were obtained:

| Time of cure | Tensile | Elongation |
| --- | --- | --- |
|  |  | Per cent |
| 10/40 | 1,770 | 650 |
| 15/40 | 1,675 | 600 |
| 20/40 | 1,285 | 560 |
| 25/40 | 1,360 | 560 |
| 30/40 | 1,120 | 650 |

*Example II.*—500 parts of ground red tube scrap, 10 parts of rosin, 10 parts of oleic acid, 10 parts of hydrocarbon oil solvent (Circo oil) and 15 parts of octane thiol were thoroughly mixed and run on a tight mill for 25 minutes. The mixture formed a sheet after about 10 minutes' working which developed into a soft, tacky stock at the end of the 25 minutes' period. The resulting product was mixed with 2% of sulfur and 1% of diphenylguanidine and cured with the following results:

| Time of cure | Tensile | Elongation |
| --- | --- | --- |
|  |  | Per cent |
| 10/40 | 1,210 | 700 |
| 15 | 1,755 | 670 |
| 20 | 1,720 | 650 |
| 25 | 2,120 | 610 |
| 30 | 1,780 | 590 |

*Example III.*—500 parts of ground red inner tubes, 25 parts of rosin, 10 parts of oleic acid, 35 parts of ethyl alcohol and 10 parts of dodecyl mercaptan were mixed for 25 minutes on a tight mill with temperatures below 140° F. and a soft, tacky sheet was obtained. This was mixed with 2% of sulfur and 1% of diphenylguanidine and cured and gave the following results:

| Time of cure | Tensile | Elongation |
| --- | --- | --- |
|  | Pounds | Per cent |
| 10/40 | 1,130 | 740 |
| 15 | 1,435 | 680 |
| 20 | 1,535 | 650 |
| 25 | 1,800 | 690 |
| 30 | 1,865 | 650 |

*Example IV.*—20 parts of ground red inner tube scrap was intimately mixed with a solution consisting of 1 part of rosin, 0.4 part oleic acid, 1.4 parts of alcohol, 0.6 part of xylyl mercaptan and 0.01 part of benzoyl peroxide. This was mixed on a tight mill for 25 minutes with the roll temperature maintained below 150° F. At the end of this time a well plasticized sheet was obtained which was capable of being recompounded and recured. When this material was mixed with 2% of sulfur and 1% of diphenylguanidine and cured the following results were obtained:

| Time of cure | Tensile | Elongation |
| --- | --- | --- |
|  |  | Per cent |
| 10/40 | 1,730 | 680 |
| 15 | 2,020 | 620 |
| 20 | 2,020 | 610 |
| 25 | 2,025 | 600 |
| 30 | 1,900 | 580 |

The plasticized rubber produced in accordance with this example was used in a regular factory formula for a high grade hose compound to replace reclaimed rubber produced by the alkali reclaim process, being used in each case with approximately an equal amount of new rubber and gave products of increased tensile strength and elongation. It was also used to replace part of the new rubber in such a high grade hose compound as well as to replace the old type of reclaim and similarly gave improved tensile and elongation, showing that the plasticized material was capable of replacing a substantial quantity of new rubber in such compounds.

The plastisized rubber was also used in a low grade mechanical compound in which an increased amount of filler was used. When used to replace the ordinary reclaimed inner tube material a materially increased tensile and elongation was obtained. When used to replace all of the new rubber as well as all of the reclaimed material vulcanized products were obtained having tensiles and elongation comparable with those obtained with the original formula.

*Example V.*—500 parts of ground inner tube scrap were mixed on a mill with 25 parts of rosin, 10 parts of oleic acid, 35 parts of alcohol and 10 parts of parathiocresol. The alcohol served as a solvent for the other materials and insured an intimate mixture with the ground scrap. At the beginning the ground tubes were a non-tacky, crumbly mass but in a short time, after about five minutes, a sheet began to form and at the end of about 20 minutes a sheet of well plasticized material was obtained.

Instead of mixing on a mill the mixing may also be carried out in an internal mixer, provided suitable pressure is maintained on the scrap as it is being worked by the revolving elements and cooling is applied to keep the temperature below about 180° F. During the mixing in the internal mixer the vulcanized scrap becomes softened and tacky and when the mass is run through the rolls of a mixing mill it sheets out into a well plasticized mass capable of recompounding and revulcanization.

A sample of the mix produced in accordance with the above example was remixed with 2% of sulfur and 1% of diphenylguanidine and recured with the following results:

| Time of cure | Tensile | Elongation |
| --- | --- | --- |
|  | Pounds | Per cent |
| 10/40 | 980 | 860 |
| 15 | 865 | 850 |
| 20 | 910 | 850 |
| 25 | 875 | 820 |
| 30 | 500 | 700 |

When the plasticized material of this example was mixed with 3% of zinc oxide, 2% of sulfur and 1% of diphenylguanidine and recured the following results were obtained:

| Time of cure | Tensile | Elongation |
| --- | --- | --- |
|  |  | Per cent |
| 10/40 | 1,445 | 850 |
| 15 | 2,145 | 840 |
| 20 | 2,370 | 810 |
| 25 | 2,740 | 800 |
| 30 | 2,520 | 770 |

The thiocresol is not an accelerator of vulcanization but appears rather to be a retarder of vulcanization, and the addition of zinc oxide is advantageous with scrap plasticized with thiocresol, as indicated by a comparison of the above results.

*Example VI.*—20 parts of mixed auto tire peelings, 0.4 part of rosin, 0.4 part of oleic acid, 0.4 part of hydrocarbon oil solvent (Circo oil) and 0.1 part of parathiocresol were run as a factory batch on a cool refiner or tight mill with the rolls maintained under 140° F. At the end of 20 minutes the batch was well softened and a good stock resulted. A portion of this was used in the following tread type compounds which were compared with a similar formula using alkali reclaim, with the following results:

| | | | | |
| --- | --- | --- | --- | --- |
| Smoke sheets | 72.5 | 72.5 | 60 | 50 |
| Alkali reclaimed tires | 50 |  |  |  |
| Plasticized treads |  | 50 | 75 | 85 |
| Reogen (sulfonated hydrocarbon plasticizer) | 1.5 | 1.5 | 1.5 | 1.5 |
| Stearic acid | 3.0 | 3.0 | 3.0 | 3.0 |
| Pine tar | 1.5 | 1.5 | 1.5 | 1.5 |
| Flectol H. (antioxidant) | 1.0 | 1.0 | 1.0 | 1.0 |
| Zinc oxide | 3.0 | 3.0 | 3.0 | 3.0 |
| Carbon black | 37.5 | 37.5 | 30.0 | 30.0 |
| Altax (accelerator) | .5 | .5 | .5 | .5 |
| Diphenylguanidine | .1 | .1 | .1 | .1 |
| Sulfur | 2.875 | 2.875 | 2.875 | 2.875 |

| Time of cure | Tensile | Elong. | Tensile | Elong. | Tensile | Elong. | Tensile | Elong. |
| --- | --- | --- | --- | --- | --- | --- | --- | --- |
|  |  | Per cent |  | Per cent |  | Per cent |  | Per cent |
| 30/30 | 2,540 | 610 | 3,010 | 700 | 2,600 | 680 | 2,590 | 680 |
| 45 | 2,500 | 570 | 2,950 | 680 | 2,940 | 670 | 2,800 | 640 |
| 60 | 2,285 | 540 | 3,130 | 630 | 3,075 | 730 | 2,870 | 630 |

These results show a very substantial improvement in both the tensile strength and elongation when a direct substitution is made of the plasticized treads of the above example and they show further that a substantial amount of new rubber can be removed and replaced by the plasticized treads and better strength characteristics of the product obtained than with the use of the alkali reclaim.

The vulcanized rubber scrap illustrated in the above examples is inner tube scrap or tire tread scrap and illustrates how vulcanized scrap of such different characteristics as inner tubes and tire treads can be plasticized and converted into a form well adapted for compounding and revulcanizing. Instead of using tire treads separated from the carcass the entire tires, including the fabric, can be ground up and treated in a similar way for purposes where the presence of the fabric is unobjectionable or desirable. Or the entire tires can be ground up and the fabric or fibers separated more or less completely and the resulting tire scrap similarly used and plasticized according to the present invention.

It is one advantage of the present process that the plasticized scrap is produced in such a condition that it can be immediately compounded when this is desirable, e. g. with sulfur, accelerators, etc., and is then ready for immediate vulcanization to produce new vulcanized products. The addition of the sulfur, accelerator, etc., can be made on the same mill on which the plasticizing takes place so that a batch of plasticized rubber, by continuing the milling operation to compound the other ingredients, can be directly formed into suitable compositions ready for vulcanization.

I claim:

1. The method of plasticizing vulcanized rubber scrap which comprises mechanically working the material under oxidizing conditions with admixed acid material and a mercaptan at a temperature below about 180° F.

2. The method of plasticizing vulcanized rubber scrap which comprises mechanically working the material under oxidizing conditions with admixed fatty acid and a mercaptan at a temperature below about 180° F.

3. The method of plasticizing vulcanized rubber scrap which comprises mechanically working the material with the admixture of a small amount of an organic acid material and of a mercaptan at a temperature below about 180° F.

4. The method of plasticizing vulcanized rubber scrap which comprises mechanically working the material with the admixture of a small amount of a fatty acid and of a thiophenol at a temperature below about 180° F.

5. The method of plasticizing vulcanized rubber scrap which comprises mechanically working the material with the admixture of a small amount of a fatty acid, of a mercaptan and of an oxidizing agent at a temperature below about 180° F.

6. The method of plasticizing vulcanized rubber scrap which comprises mechanically working the material with the admixture of a small amount of an organic acid material, of a mercaptan and of benzoyl peroxide at a temperature below about 180° F.

7. The method of plasticizing vulcanized rubber scrap which comprises mechanically working the material with the admixture of a mercaptan and an organic acid material selected from the group consisting of higher fatty acids and rosin at a temperature below about 180° F.

8. The method of plasticizing vulcanized rubber scrap which comprises mechanically working the material with the admixture of a thiophenol and an organic acid material selected from the group consisting of higher fatty acids and rosin at a temperature below about 180° F.

WALTER W. EVANS.

Certificate of Correction

Patent No. 2,414,145.

January 14, 1947.

WALTER W. EVANS

It is hereby certified that error appears in the printed specification of the above numbered patent requiring correction as follows: Column 3, line 58, for "510°" read *150°*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.* admixed fatty acid and a mercaptan at a temperature below about 180° F.

3. The method of plasticizing vulcanized rubber scrap which comprises mechanically working the material with the admixture of a small amount of an organic acid material and of a mercaptan at a temperature below about 180° F.

4. The method of plasticizing vulcanized rubber scrap which comprises mechanically working the material with the admixture of a small amount of a fatty acid and of a thiophenol at a temperature below about 180° F.

5. The method of plasticizing vulcanized rubber scrap which comprises mechanically working the material with the admixture of a small amount of a fatty acid, of a mercaptan and of an oxidizing agent at a temperature below about 180° F.

6. The method of plasticizing vulcanized rubber scrap which comprises mechanically working the material with the admixture of a small amount of an organic acid material, of a mercaptan and of benzoyl peroxide at a temperature below about 180° F.

7. The method of plasticizing vulcanized rubber scrap which comprises mechanically working the material with the admixture of a mercaptan and an organic acid material selected from the group consisting of higher fatty acids and rosin at a temperature below about 180° F.

8. The method of plasticizing vulcanized rubber scrap which comprises mechanically working the material with the admixture of a thiophenol and an organic acid material selected from the group consisting of higher fatty acids and rosin at a temperature below about 180° F.

WALTER W. EVANS.

Certificate of Correction

Patent No. 2,414,145.

January 14, 1947.

WALTER W. EVANS

It is hereby certified that error appears in the printed specification of the above numbered patent requiring correction as follows: Column 3, line 58, for "510°" read *150°*; and that the said Letters Patent should be read with this correction therein that the same may conform to the record of the case in the Patent Office.

Signed and sealed this 15th day of April, A. D. 1947.

[SEAL]

LESLIE FRAZER,
*First Assistant Commissioner of Patents.*